United States Patent
Rovira et al.

(10) Patent No.: US 6,712,333 B2
(45) Date of Patent: Mar. 30, 2004

(54) VALVE MECHANISM

(75) Inventors: Juan Rovira, Garbsen (DE); Andreas Teichmann, Isernhagen (DE)

(73) Assignee: WABCO GmbH & Co. OHG, Hannover (DE)

( * ) Notice: Subject to any disclaimer, the term of this patent is extended or adjusted under 35 U.S.C. 154(b) by 175 days.

(21) Appl. No.: 10/024,155

(22) Filed: Dec. 18, 2001

(65) Prior Publication Data
US 2002/0074532 A1 Jun. 20, 2002

(30) Foreign Application Priority Data

Dec. 20, 2000 (DE) .......................... 100 63 710

(51) Int. Cl.$^7$ .............................................. F16K 31/02
(52) U.S. Cl. ..................... 251/129.19; 251/77
(58) Field of Search ....................... 251/64, 77, 129.02, 251/129.01, 129.15, 129.21, 129.19

(56) References Cited

U.S. PATENT DOCUMENTS

| | | | |
|---|---|---|---|
| 3,098,635 A | * | 7/1963 | Delaporte et al. ............. 251/54 |
| 3,647,177 A | | 3/1972 | Lang |
| 3,671,009 A | * | 6/1972 | Stampfli ................. 251/129.07 |
| 3,740,019 A | | 6/1973 | Kessell et al. |
| 3,791,408 A | | 2/1974 | Saitou et al. |
| 4,008,876 A | * | 2/1977 | Bastle .................... 251/129.19 |
| 4,595,171 A | | 6/1986 | Torrence |
| 5,791,746 A | | 8/1998 | Groll et al. |
| 5,878,991 A | | 3/1999 | Krimmer et al. |

FOREIGN PATENT DOCUMENTS

| | | |
|---|---|---|
| DE | 27 57 803 | 7/1978 |
| DE | 89 14 152 | 3/1990 |
| DE | 44 05 915 | 8/1995 |
| FR | 1 555 357 A | 1/1969 |
| GB | 1556942 | 12/1979 |

* cited by examiner

*Primary Examiner*—Edward K. Look
*Assistant Examiner*—John K. Fristoe, Jr.
(74) *Attorney, Agent, or Firm*—Kramer Levin Naftalis & Frankel LLP

(57) ABSTRACT

A valve mechanism in which a valve member is moveable into contact with a valve seat as a result of actuation of the valve. The valve seat and the valve closure member are designed such that they have essentially only line contact when the valve is closed, with the nominal width of the valve corresponding approximately to the sealing width of the valve. This construction allows a relatively large nominal width to be used for the flow cross section of the valve without the need for a much larger actuating force for the valve. To prevent damage to the valve seat and to the valve closure member, an elastic damping element may be disposed behind the valve closure member so that the valve closure member can deform compliantly up impact against the valve seat.

22 Claims, 2 Drawing Sheets

VALVE MECHANISM

BACKGROUND OF THE INVENTION

The present invention is directed generally to a valve mechanism and, in particular, to a valve mechanism specifically designed to allow use of a lower force to actuate the valve while providing superior sealing characteristics.

A valve mechanism of the general type under consideration is described for example, in German Patent Publication No. DE 27 57 803 (corresponding to British Published Patent Specification No. 1, 556, 942). Such a valve mechanism includes a valve seat, a valve closure member and an actuating element which drives the valve closure member. The armature of an electromagnet in the valve is the actuating element. The valve closure member is disposed on the armature in such a way that it can move relative to the armature, toward or away from the armature. A spring is disposed between the armature and the valve closure member. By passing current through the electromagnet, the armature together with the valve closure member can be moved from a first position, such as the open position of the valve, to a second position, such as the closed position of the valve.

A valve mechanism of this construction generally has only a relatively small flow cross section, or in other words a relatively small nominal width, in order to minimize the actuating force for the valve. A large flow cross section would require a relatively large actuating force and thus the use of powerful electromagnets, which in turn are relatively large in size.

Accordingly, it is desired to provide an improved valve mechanism of the type under discussion which allows a lower actuating force to be used even when a larger flow cross section is provided.

SUMMARY OF THE INVENTION

Generally speaking, in accordance with the present invention, a valve mechanism including a valve housing, is provided. The valve housing includes a pressurized fluid inlet and a pressurized fluid outlet. A movable valve member defining a longitudinal axis is positioned on the valve housing for movement between a first position where the valve is opened and a second position where the valve is closed. The valve member includes a valve closure member having a predetermined configuration disposed thereon for movement in the direction of the longitudinal axis. A damping element is disposed between the valve member and the valve closure member. The valve housing has a valve seat defining an opening through which pressurized fluid flows when the valve is opened. The damping element cushions the impact of the valve closure member against the valve seat when the valve member is closed. The valve seat and valve closure member define a sealing width which corresponds essentially to the diameter of the opening. At least a portion of the valve closure member is made of a hard material. The predetermined configuration of the valve closure member allows it to have essentially only line contact with valve seat when the valve is closed.

The present invention offers in particular the advantage that the valve mechanism can work with relatively low actuating energy even if it has relatively large nominal width. As used herein, the nominal width corresponds approximately to the sealing width of the valve. For the present purposes, nominal width is understood as the bore diameter of the valve seat, while the sealing width is understood as the largest diameter of the valve seat with which the valve seat is still in contact with the valve closure member when the valve is closed. In the valve mechanism of the present invention, the largest diameter of the valve seat corresponds approximately to the bore diameter of the valve seat, and so the valve seat has essentially only peripheral or line contact with the valve closure member.

The sealing width of a valve is critical to its sealing force. If the valve has large sealing width and thus a large sealing force, a relatively large restoring force, such as exerted by a relatively strong spring, is necessary to return the valve to its open position from its closed position after a closing process. Accordingly, a relatively large actuating force, sufficient to overcome the restoring force, is necessary to close the valve. On the other hand, if the valve has a sealing width corresponding approximately to its nominal width, as is the case in the valve mechanism of the present invention, the restoring force necessary to open the valve is relatively small. The actuating force necessary to overcome the restoring force during the process of closing of the valve is then also relatively small. The inventive valve mechanism can therefore have a relatively large nominal width, thus achieving the advantage of short air-admission and venting times for pneumatic devices connected to the valve mechanism.

If an electromagnetic arrangement is used for actuating the valve mechanism, it can also be kept relatively small by virtue of the relatively small force necessary for actuating the valve, thus achieving a reduction of weight and cost in addition to the advantage of a smaller space requirement.

Due to the fact that the valve closure member of the present invention may have a conical or spherical shape and may be made of relatively hard material, and the fact that the valve seat may be formed by the circumferential edge of a flow orifice, essentially only peripheral edge contact between the valve seat and valve closure member is achieved while the valve is closed.

In addition, by disposing a damping element between the valve closure member and actuating element, the impact energy is absorbed and thus wear of the valve closure member is reduced. The consequence of wear or plastic deformation caused by undamped impact would be enlargement of the area of contact between the valve closure member and the valve seat. In turn, the sealing width of the valve would become undesirably large and large leaks would develop due to wear.

Accordingly, it is an object of the present invention to provide an improved valve mechanism used to control the flow of pressurized fluid.

Another object of the present invention is to provide a valve mechanism in which a smaller actuating force is required to actuate the valve.

A further object of the present invention is to provide a valve mechanism in which a larger flow cross section can be presented without a corresponding increase in the actuating force.

A still further object of the present invention is to provide a valve mechanism of the type described, in which larger nominal widths can be achieved while largely avoiding the noted disadvantages of the prior art.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
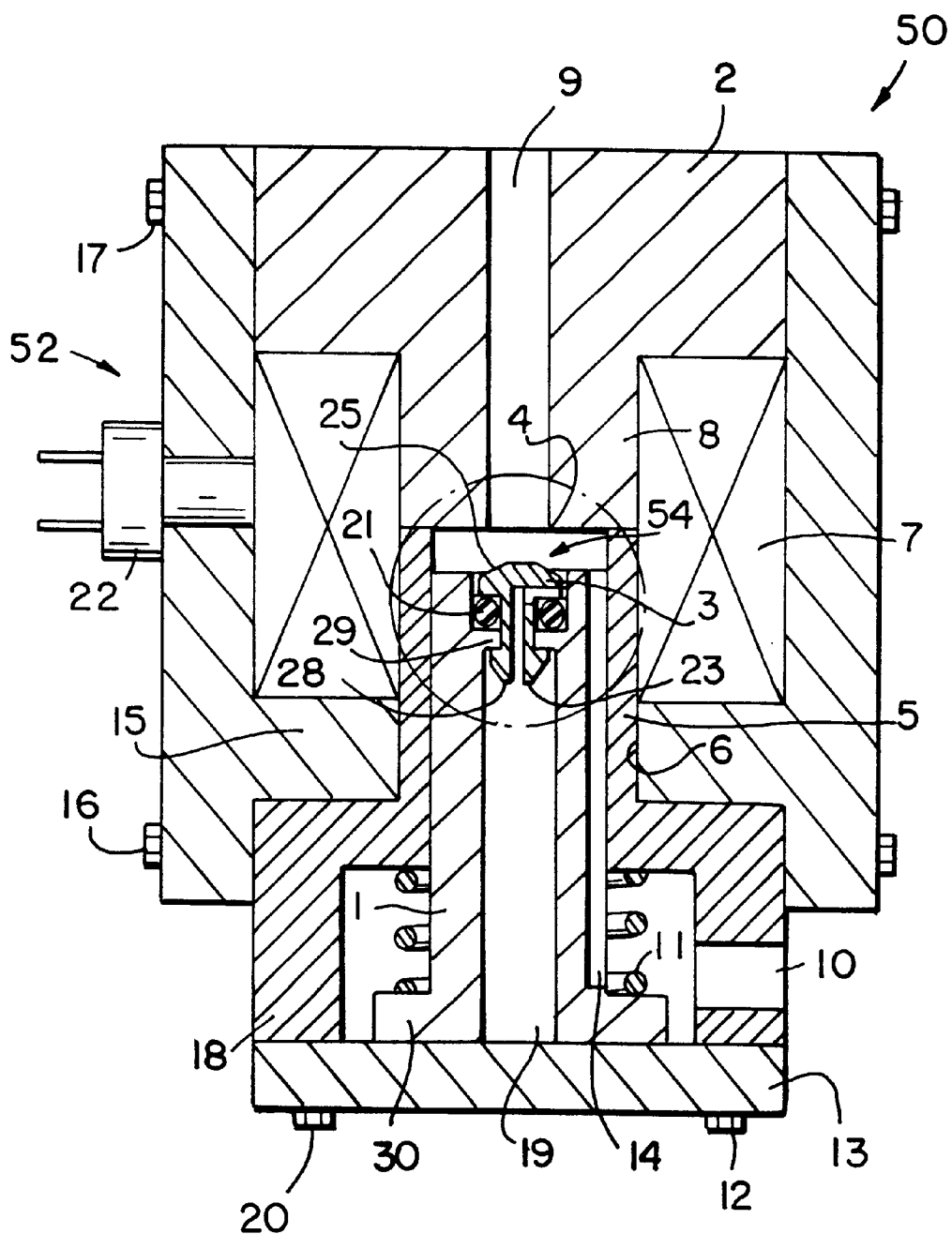
FIG. 1 is a cross-sectional view of a preferred embodiment of a valve mechanism depicted as a 2/2-way valve, constructed in accordance with the present invention; and, FIG. 2 is an enlarged cross-sectional detail view of the indicated portion of the valve mechanism depicted in FIG. 1.

Referring to the drawing figures where like reference numerals are used for corresponding parts, a valve mechanism, generally indicated as 50, constructed in accordance with a preferred embodiment of the present invention, is depicted.

Valve mechanism 50 is designed as an electromagnetically actuatable 2/2-way valve used to control a flow of pressurized fluid such as air in response to an electrical signal which provides the actuating energy. Hence, valve mechanism 50 can be switched between positions which admit and which shut off flow of pressurized fluid. It is noted that the invention is not limited to this embodiment, however, as it also includes any other desired embodiments, such as a 3/2-way valve. In the valve mechanism described hereinafter, electrical energy, preferably supplied to the valve mechanism as an electrical signal, is used as the actuating energy.

Referring first to FIG. 1, the construction and actuating principles of valve mechanism 50 will now be described. Valve mechanism 50 is provided with a valve housing, generally indicated as 52, having housing components 2, 13, 15 and 18 comprising several housing parts, which are coupled together by means of screws 12, 16, 17 and 20 as depicted. In order to provide a leakproof valve, seals (not depicted) may be disposed between the contact faces of the housing components.

Valve housing 52 is provided with a pressurized-fluid duct 10 functioning as a pressurized-fluid inlet, and with a pressurized-fluid duct 9 functioning as a pressurized-fluid outlet, to which pressurized-fluid lines can be connected, respectively.

To shut off the flow of pressurized fluid through the valve mechanism, valve housing 52 includes a valve 54 comprising a valve seat 4 and a valve closure member 3 that can be moved toward or away from valve seat 4. Valve seat 4 is disposed at the end, located inside valve housing 52, of pressurized-fluid duct 9 functioning as the pressurized-fluid outlet. As such, it comprises the end of pressurized-fluid duct 9 facing valve closure member 3.

A tubular part 5 of housing part 18 of the valve housing 52 extends into a housing cavity 6 disposed equiaxially with valve seat 4 inside housing part 15 of the valve housing 52. Inside tubular part 5 there is disposed an armature 1 of an electromagnet arrangement, which functions as an actuating element for valve 54 and which can be moved toward valve seat 4 or away from valve seat 4.

Armature 1 has a cavity 19 extending in the direction of the longitudinal axis of armature 1. In the end region of cavity 19 facing valve seat 4, armature 1 has an annular projection 29 which extends radially inward. At its end facing away from valve seat 4, armature 1 has a collar 30 which extends radially outward. Inside housing part 18, a spring 11 is disposed in such a way that it is braced with one of its ends against a wall of housing part 18, while with its other end it urges collar 30 of armature 1 away from valve seat 4.

Valve closure member 3 is formed by a cylindrical piece having a predetermined configuration provided at its end facing valve seat 4 with a portion 25 tapering conically toward valve seat 4. Due to the fact that valve closure member 3 is provided with conically tapering portion 25 in a frusto-conical configuration and valve seat 4 is formed by the circumferential edge of pressurized-fluid duct 9, valve closure member 3 has essentially only peripheral line contact with valve seat 4. Accordingly, during the process of closing of valve 54, the portion of conically tapering portion 25 of valve closure member 3 which corresponds to the circumferential edge bears against the circumferential edge of pressurized-fluid duct 9 with its valve closure face, which is inclined relative to the longitudinal axis of valve seat 4. Because of this corresponding configuration of valve seat 4 and valve closure member 3, the nominal width of valve 54 corresponds approximately to the sealing width of valve 54. By virtue of the very small difference between the nominal width and the sealing width of valve 54, the sealing force of valve 54 and thus also the force necessary to actuate valve 54 is reduced.

Figure 2:
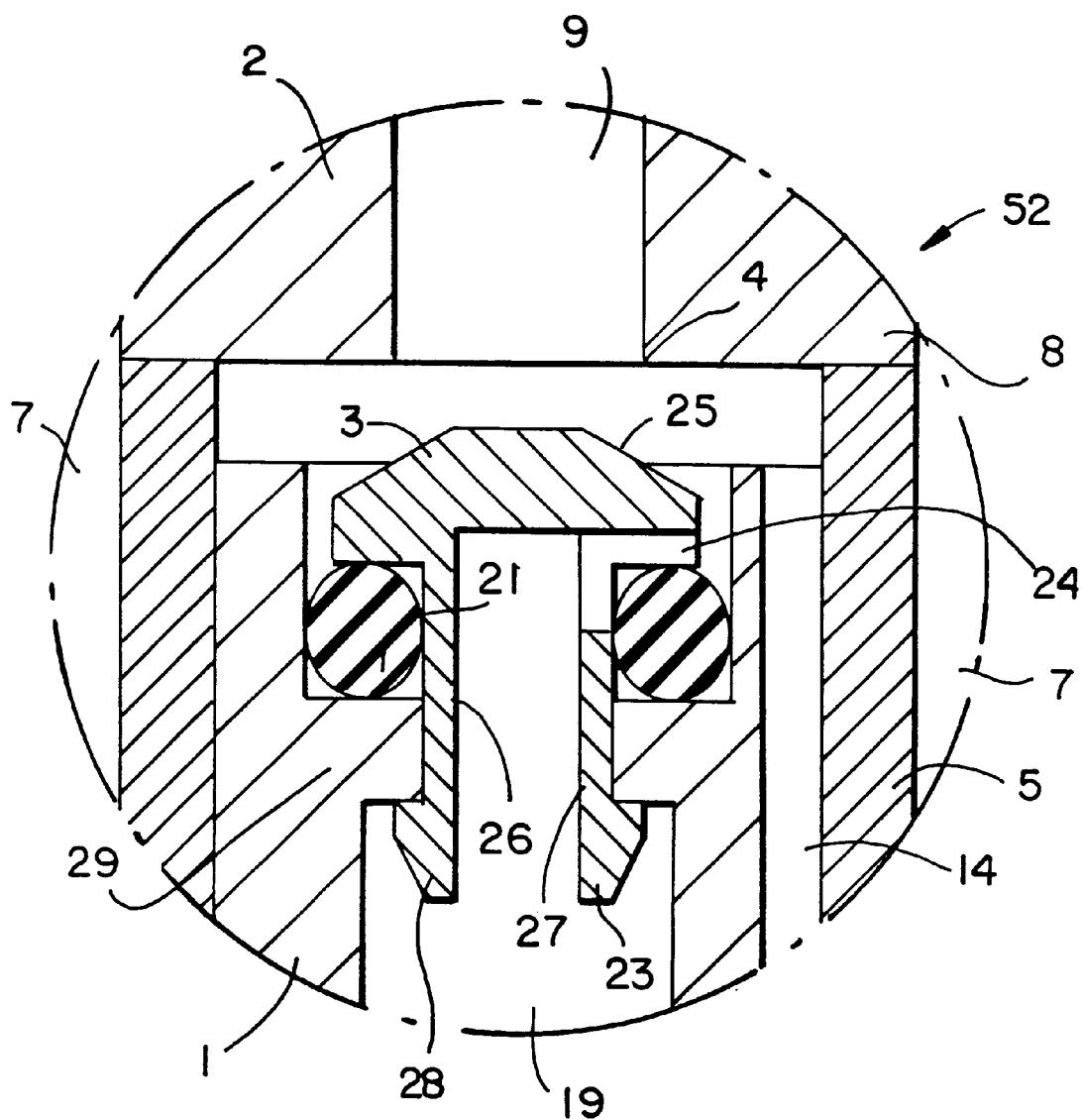

At its end facing away from valve seat 4, valve closure member 3, as best illustrated in FIG. 2, is provided with a plurality of extensions 26 and 27, which extend away from valve closure member 3 in the direction of the longitudinal axis of valve closure member 3. Each of these extensions 26 and 27 has an outwardly extending nose-like projection 23 and 28, respectively, at its free end.

Valve closure member 3 is disposed in such a way in armature 1 that its extensions 26 and 27 pass through annular projection 29 in cavity 19 of armature 1, whereupon its nose-like projections 23 and 28 snap in behind annular projection 29. In this manner, valve closure member 3 or part thereof is designed as a latching insert, which is movably joined to armature 1 in the direction of the longitudinal axis of armature 1 functioning as the actuating element.

Between the end of valve closure member 3 facing away from valve seat 4 and annular projection 29 in cavity 19 of armature 1 there is preferably disposed a damping element 21, which serves to cushion the impact of valve closure member 3 on valve seat 4 during closing of valve 54. Damping element 21 is preferably made of an elastically deformable material such as rubber or plastic and can be designed, for example, as an O-ring. The cross section of damping element 21 as well as the distance between annular projection 29 in cavity 19 of armature 1 and the end of valve closure member 3 facing it are dimensioned such that damping element 21 is preferably under only slight initial load when valve closure member 3 is bearing with its nose-like projections 23 and 28 against that end of annular projection 29 in cavity 19 of armature 1 which faces away from valve closure member 3.

In its axial extent, valve closure member 3 is dimensioned such that it extends beyond armature 1 only far enough toward valve seat 4 to ensure secure closing of valve 34. Valve closure member 3 can also be dimensioned in such a way in its axial extent that the leading end of armature 1 cannot impact on housing part 2 of the housing provided with valve seat 4 even if valve closure member 3 is thrust further into cavity 19 of armature 1, against the force of damping element 21, during a process of closing of valve 54. Because of the presence of an air gap between armature 1 and housing part 2 of the housing provided with valve seat 4 in such an embodiment, armature 1 together with its valve closure member 3 can detach more easily from the part of the housing provided with valve seat 4 during opening of valve 54. In this way sticking of armature 1 due to an oil or grease film between armature 1 and housing part 2 of the housing provided with valve seat 4 is prevented.

As already described hereinabove, the presence of damping element 21 between armature 1 and valve closure member 3 allows valve closure member 3 to deform compliantly during an impact on valve seat 4 resulting from valve actuation.

Tubular part 5 of housing part 18 of the valve housing 52 functions as a guide device for armature 1, which is movable therein. Armature 1 has a pressurized-fluid duct 14, through which the pressurized fluid can flow from inlet duct 10 to outlet duct 9 in the opened condition of valve 34 of the valve mechanism, as shown in FIG. 1. To reduce weight, armature 1 may also be provided with a hollow space formed by cavity 19.

The electromagnet arrangement described above is provided not only with armature 1 but also with a core 8 comprising a stepped portion of housing part 2, a coil 7 and a yoke comprising housing part 15.

Coil 7 is disposed immovably relative to the valve housing 32 and surrounds core 8 as well as tubular part 5 of housing part 18. The function of coil 7 is to transform the electrical actuating energy to magnetic force. When a sufficiently large electric current is supplied, coil 7 cooperates with yoke 15 and core 8 to move armature 1 toward core 8. Coil 7 comprises electrically conductive wire. To supply electric current to coil 7, an electrical terminal element 22 in electrical connection with coil 7 is disposed at an opening of housing part 15.

Armature 1 is held by spring 11 in the position illustrated in FIG. 1 as long as no current sufficient to overcome the spring resistance flows in coil 7. In this condition, valve 54 of the valve mechanism is in open position. Pressurized fluid can flow from pressurized-fluid duct 10, which functions as the pressurized-fluid inlet, to pressurized-fluid duct 9, which functions as the pressurized-fluid outlet.

Armature 1, housing components 2 and 15 and core 8 interacting magnetically with one another are made of magnetically conductive material, such as a soft magnetic material, preferably steel. Housing parts 13 and 18, and tubular part 5 are made of magnetically nonconductive material, such as plastic or brass. In an advantageous improvement, by virtue of the air gap described hereinabove, armature 1 may be made of surface-protected machining steel. This permits the advantage of larger magnetic force than is possible with armatures of stainless steel that is otherwise used as material for magnetic valves.

When a sufficiently large electrical current is applied to the coil, armature 1 moves toward core 8 until valve closure member 3 impacts on valve seat 4. Once any resulting transient effects that may occur have died out, a corresponding portion of valve closure member 3 then bears against the ring of valve seat 4. Valve 54 is then closed, whereby pressurized-fluid duct 10 functioning as the pressurized-fluid inlet is then shut off from pressurized-fluid duct 9 functioning as the pressurized-fluid outlet. In this fashion, valve closure member 3 then has essentially only line contact with valve seat 4.

As is evident in particular from FIG. 2, valve closure member 3 is provided at its end facing away from the valve closure face with two nose-like projections 23 and 28, which are disposed on extensions 26 and 27 respectively of valve closure member 3 and which function to secure valve closure member 3 on armature 1 and, in the assembled condition of valve closure member 3, snap in behind annular projection 29 in cavity 19 of armature 1. Relative to valve seat 4, damping element 21 is disposed under valve closure member 3 or behind the valve closure face.

Valve closure member 3 is further provided with openings having the form, for example, of grooves 24, through which cavity 19 in armature 1 is in communication with pressurized-fluid duct 10 or with duct 14. In this way, when armature 1 is used in a 3/2-way electromagnetic valve configuration, air as the pressurized fluid can be admitted to cavity 19 in armature 1 to prevent overpressure. Thus, the need for an otherwise conventional vent hole in the armature can be eliminated.

In a preferred embodiment of the invention, damping element 21 is made of an elastomer such as rubber, in the form of an O-ring. This has the advantage that damping element 21 can survive, without damage, a large number of deformations caused by valve actuations. Further equally advantageous alternatives for the construction of damping element 21 are the use of vulcanized rubber, thermoplastic elastomers or parts made from metal, such as a sheet-metal part of spring steel, a cup spring or a spiral spring.

Valve-closure member 3 can be tapered conically toward valve seat 4 or it can be provided with a portion 25 tapering conically toward valve seat 4 or with a hemispherical portion, which bears against valve seat 4 when valve 54 is closed. Alternatively, however, valve closure member 3 can be spherical or have any other shape suitable for creating essentially only line contact with the valve seat.

In the preferred embodiment, valve closure member 3 is designed such that its valve closure face has a portion which is inclined or curved relative to the longitudinal axis of valve seat 4, or which is convex or bulges toward valve seat 4, and such that valve seat 4 has an edge or rim shape which permits essentially only peripheral contact between valve seat 4 and the valve closure face of valve closure member 3.

Valve seat 4 can comprise, for example, the rim of a flow orifice for pressurized fluids, disposed in the wall of the valve housing separating a pressurized-fluid inlet chamber from a pressurized-fluid outlet chamber. Alternatively, however, the flow orifice can also comprise a pressurized-fluid line of the valve housing functioning as the outlet duct or possibly as the inlet duct. The circumferential edge or rim of the flow orifice comprising the valve seat can be slightly rounded. In order to approximate line contact between valve seat and valve closure member as closely as possible, however, it is advantageous to make the rim of the flow orifice as sharp-edged as possible.

It is also possible according to the present invention to design the valve seat such that it flares in the shape of a funnel toward the valve closure member. For such a configuration of the valve seat, the valve closure member will advantageously be cylindrical or even spherical, in order to achieve at least approximately line contact between valve closure member and valve seat when the valve is closed.

At least the region of valve closure member 3 provided with the valve closure face should preferably be made, according to the invention, of a hard material such as steel or extremely resistant or resilient plastic.

The valve mechanism can be used both in hydraulically and in pneumatically operated devices and systems. Electrical energy or pressurized-fluid energy can be used as the actuating energy. If pressurized fluid is used as the actuating energy, a piston on which the pressurized fluid can act will be used as the actuating element for the valve closure member.

Accordingly, the present invention provides an improved valve mechanism which allows a lower actuating to be used to actuate the valve due to the corresponding configuration of the valve seat and valve closure member.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A valve mechanism comprising a valve housing having a pressurized fluid inlet and a pressurized fluid outlet, a movable valve member defining a longitudinal axis positioned on said valve housing for movement between a first position where a pressurized fluid is allowed to flow from said fluid inlet to said fluid outlet and a second position where a pressurized fluid is blocked from flowing said fluid inlet to said fluid outlet, said valve member including a valve closure member having a predetermined configuration disposed thereon for movement in the direction of said longitudinal axis, a damping element disposed intermediate said valve member and said valve closure member, said valve housing including a valve seat defining an opening through which a pressurized fluid can flow when said valve member is in said first position, said damping element cushioning the impact of said valve closure member against said valve seat when said valve member is moved from its first to its second position, said valve seat and valve closure member defining a sealing width, said sealing width corresponding essentially to the diameter of said opening, at least a portion of said valve closure member which contacts said valve seat being formed from a hard material, said predetermined configuration of said valve closure member allowing said valve closure member to have essentially only line contact with said valve seat when said valve member is in said second position.

2. The valve mechanism as claimed in claim 1, wherein said valve seat includes a circumferential edge around said opening opposing said valve closure member.

3. The valve member as claimed in claim 2, wherein said valve closure member makes line contact with said circumferential edge when said valve member is in its second position.

4. The valve mechanism as claimed in claim 1, wherein said valve closure member includes at least a portion that tapers toward said valve seat.

5. The valve mechanism as claimed in claimed 4, wherein said valve closure member is frusto-conically shaped.

6. The valve mechanism as claimed in claim 1, wherein said valve seat flares in the shape of a funnel toward said valve closure member.

7. The valve mechanism as claimed in claim 1, wherein said valve closure member is formed as an insert to be removably coupled to said valve member.

8. The valve mechanism as claimed in claim 1, wherein said damping element is made of an elastomeric material.

9. The valve mechanism as claimed in claim 1, wherein said damping element is annular.

10. The valve mechanism as claimed in claim 1, wherein said damping element acts as a spring.

11. The valve mechanism as claimed in claim 1, further comprising an electromagnet having a coil and an armature supported on said housing, said armature selectively actuating said valve member from said first to said second position.

12. The valve mechanism as claimed in claim 11, wherein said armature is formed from a surface-protected machining steel.

13. The valve mechanism as claimed in claim 1, further comprising a biasing means for biasing said valve member in its first position.

14. The valve mechanism as claimed in claim 12, wherein said biasing means is a spring.

15. The valve mechanism as claimed in claim 1, wherein said damping element has at least one orifice, said valve member having a cavity, said orifice being in selective communication with said cavity.

16. The valve mechanism as claimed in claim 1, wherein said valve closure member is disposed on said valve member and dimensioned such that impact of said valve member against said valve housing proximate said valve seat is essentially prevented when said valve member is moved to its second position.

17. A valve mechanism comprising a valve housing having a pressurized fluid inlet and a pressurized fluid outlet, a movable valve member positioned on said valve housing for movement between a first position where a pressurized fluid is allowed to flow from said fluid inlet to said fluid outlet and a second position where a pressurized fluid is blocked from flowing from said fluid inlet to said fluid outlet, electromagnetic means on said housing for moving said valve member from its first to its second position along a longitudinal axis, said valve member including a valve closure member having a predetermined configuration cushionably supported said valve member and movable relative to said valve member, said valve housing including a valve seat defining an opening through which a pressurized fluid can flow when said valve member is in said first position, said opening having an edge, the predetermined configuration of said valve closure member allowing said valve closure member to bear essentially only against said edge of said opening when said valve member is moved to said second position after actuation of said electromagnetic means.

18. The valve mechanism as claimed in claim 17, wherein said electromagnetic means includes an electromagnet on said housing and said valve member constitutes an armature of said electromagnetic means.

19. The valve as claimed in claim 18, wherein said valve closure member makes essentially only line contact with said valve seat when said valve member is in its second position.

20. A valve mechanism comprises a value housing having a pressurized fluid inlet and a pressurized fluid outlet, a movable valve member positioned on said valve housing for movement between a first position where a pressurized fluid is allowed to flow from said fluid inlet to said fluid outlet and a second position where a pressurized fluid is blocked from flowing from said fluid inlet to said fluid outlet, electromagnetic means on said housing for moving said valve member from its first to its second position along a longitudinal axis, said valve member including a valve closure member having a predetermined configuration cushionably supported thereon by a damping element disposed intermediate said valve member and said valve closure member, said valve housing including a valve seat defining an opening through which a pressurized fluid can flow when said valve member is in said first position, said opening having an edge, the predetermined configuration of said valve closure member allowing said valve closure member to bear essentially only against said edge of said opening when said valve member is moved to said second position after actuation of said electromagnetic means.

21. The valve mechanism as claimed in claim 20, wherein said electromagnetic means includes an electromagnet on said housing and said valve member constitutes an armature of said electromagnetic means.

22. The valve mechanism as claimed in claim 21, wherein said valve closure member makes essentially only line contact with said valve seat when said valve member is in its second position.

* * * * *